United States Patent
Kim et al.

(10) Patent No.: US 10,665,910 B2
(45) Date of Patent: May 26, 2020

(54) BATTERY PACK USING DIRECT COOLING METHOD ON EDGE SURFACE OF BATTERY

(71) Applicant: LG CHEM, LTD., Seoul (KR)

(72) Inventors: Tae-Geun Kim, Daejeon (KR); Jin-Woo Park, Daejeon (KR); Bok-Gun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/060,239

(22) PCT Filed: Sep. 11, 2017

(86) PCT No.: PCT/KR2017/009952
§ 371 (c)(1),
(2) Date: Jun. 7, 2018

(87) PCT Pub. No.: WO2018/080010
PCT Pub. Date: May 3, 2018

(65) Prior Publication Data
US 2018/0366794 A1    Dec. 20, 2018

(30) Foreign Application Priority Data

Oct. 31, 2016    (KR) .................. 10-2016-0143386

(51) Int. Cl.
*H01M 10/613*    (2014.01)
*H01M 10/647*    (2014.01)
(Continued)

(52) U.S. Cl.
CPC ....... *H01M 10/613* (2015.04); *H01M 2/1077* (2013.01); *H01M 10/625* (2015.04);
(Continued)

(58) Field of Classification Search
None
See application file for complete search history.

(56) References Cited

U.S. PATENT DOCUMENTS 9,359,742 B2    6/2016    Adachi
2011/0189522 A1    8/2011    Kim
(Continued)

FOREIGN PATENT DOCUMENTS

DE    102011016048 A1    10/2012
EP    2955780 A1    12/2015
(Continued)

OTHER PUBLICATIONS

International Search Report for PCT/KR2017/009952 dated Jan. 12, 2018.

*Primary Examiner* — Haroon S. Sheikh
(74) *Attorney, Agent, or Firm* — Birch, Stewart, Kolasch & Birch, LLP

(57) ABSTRACT

Disclosed is a battery pack using a direct cooling method on the edge surface of a battery. The direct cooling-type battery pack, which is prevented from leakage caused by swelling through a cooling surface formed on an edge surface of a battery cell and is applicable to a bi-directional cell, includes: a battery module having a plurality of battery cells stacked therein; a cooling frame corresponding to a casing in which the battery module is received, and forming a cooling surface on an edge surface in a direction of 90° from a stacking surface on which the battery cells are stacked; and a heat sink which is positioned at the bottom of the cooling surface, is coupled with a cooling frame enclosing the battery module and mounted to the upper part thereof, stores a coolant therein, and supplies the stored coolant to the (Continued)

cooling surface. According to the present disclosure, a direct cooling-type cooling surface is formed on one edge surface of a battery pack to prevent leakage of a coolant caused by swelling and to provide a battery pack applicable to a bi-directional cell.

11 Claims, 8 Drawing Sheets

(51) Int. Cl.
*H01M 10/653* (2014.01)
*H01M 10/6551* (2014.01)
*H01M 10/6555* (2014.01)
*H01M 10/6567* (2014.01)
*H01M 10/6556* (2014.01)
*H01M 2/10* (2006.01)
*H01M 10/625* (2014.01)

(52) U.S. Cl.
CPC ....... *H01M 10/647* (2015.04); *H01M 10/653* (2015.04); *H01M 10/6551* (2015.04); *H01M 10/6555* (2015.04); *H01M 10/6556* (2015.04); *H01M 10/6567* (2015.04); *H01M 2/1061* (2013.01)

(56) References Cited

U.S. PATENT DOCUMENTS

| | | | |
|---|---|---|---|
| 2012/0301771 A1* | 11/2012 | Moser | H01M 10/625 |
| | | | 429/120 |
| 2013/0004822 A1* | 1/2013 | Hashimoto | H01M 2/1072 |
| 2013/0280564 A1 | 10/2013 | Zheng et al. | |
| 2014/0106199 A1 | 4/2014 | Meintschel et al. | |
| 2014/0234691 A1 | 8/2014 | Lee et al. | |
| 2017/0294693 A1* | 10/2017 | Tong | H01M 10/653 |

FOREIGN PATENT DOCUMENTS

| | | |
|---|---|---|
| EP | 3297090 A1 | 3/2018 |
| JP | 2014-93242 A | 5/2014 |
| JP | 2014-130780 A | 7/2014 |
| JP | 2014-191916 A | 10/2014 |
| JP | 2015-106527 A | 6/2015 |
| JP | 2016-131155 A | 7/2016 |
| KR | 10-2011-0089661 A | 8/2011 |
| KR | 10-20113-0086678 A | 8/2013 |
| KR | 10-2016-0065637 A | 6/2016 |

* cited by examiner

BATTERY PACK USING DIRECT COOLING METHOD ON EDGE SURFACE OF BATTERY

TECHNICAL FIELD

The present application claims priority to Korean Patent Application No. 10-2016-0143386 filed on Oct. 31, 2016 in the Republic of Korea, the disclosures of which are incorporated herein by reference.

The present disclosure relates to a battery pack. More particularly, the present disclosure relates to a direct cooling-type battery pack, which has a cooling surface at an edge surface thereof to prevent leakage caused by swelling of a battery and is applicable to a bi-directional battery.

BACKGROUND ART

Cooling of a battery is directly related with stable charge/discharge functions and life of the battery. Cooling methods of a battery may be classified into a direct cooling method and an indirect cooling method. A direct cooling method includes forming a flow path through which a coolant flows and allowing the formed cooling flow path to cool a battery cell directly. An indirect cooling method includes allowing a heat conductive member to be in contact with a battery cell without any flow path and cooling the battery cell indirectly through the heat conduction of the heat conductive member.

FIG. 1 and FIG. 2 show the conventional battery pack.

Referring to FIG. 1a and FIG. 1b, the battery pack 100 using a direct cooling method forms a hexahedron. For convenience of description, the hexahedron has surface or side ① as the top surface having a lead 103 of a battery cell 102, surface ② as the bottom surface opposite to surface ① and having a pack level cooling system 104, surface ③ and surface ④ as the surfaces positioned in the battery stacking direction, and surface ⑤ and surface ⑥ as the remaining edge surfaces.

In the battery pack 100, a cooling plate 101 having a cooling pipe is positioned between the bodies of the battery cell 102, and the cooling plate 101 cools the battery cell 102. When the cooling plate 101 is positioned in every gap between the adjacent battery cells 102, at most four cooling plates may be positioned among three battery cells 102 as follows: cooling plate 1+battery 1+cooling plate 2+battery 2+cooling plate 3+battery 3+cooling plate 4. Surface ①, which is the top surface of the battery pack 100, has an electrode lead 103 positioned thereon and is covered with a lid at the upper part thereof. Surface ②, which is the bottom surface of the battery pack 100, has a pack level cooling system 104 positioned thereon to supply a coolant (cooling water) upwardly to the cooling plate 101.

Herein, since the pack level cooling system 104 is positioned on surface ②, which is opposite to surface ① having the lead 103, it can be applied merely to a uni-directional cell and cannot be applied to a bi-directional cell. The cooling structure of such a system 104 merely applicable to a uni-directional cell is limited, and thus a degree of freedom in designing a pack/module of a battery is decreased.

Referring to FIG. 2, a battery is expanded due to swelling during the operation thereof. Then, cell swelling directions are formed toward surface ③ and surface ④. Herein, when the cooling plate 101 is fixed to the pack level cooling system 104 on surface ② at the bottom, the top of the plate 101 is spaced along the swelling directions of surface ③ and surface ④. After that, leakage of a coolant occurs on surface ②, where the bottom plate 101 and the system 104 are coupled with each other, due to the spacing of the top of the plate 101 caused by cell swelling. Such leakage of a coolant causes degradation of the life of a battery and a failure in operation of a battery, and thus adversely affects devices (e.g. electric vehicles) to which electric power is supplied from the battery.

DISCLOSURE

Technical Problem

The present disclosure is designed to solve the problems of the related art, and therefore the present disclosure is directed to providing a direct cooling-type battery pack, which is prevented from leakage through an edge surface cooling method safe against the swelling of a battery pack and is applicable to a bi-directional cell.

The present disclosure is also directed to providing a direct cooling method which provides a coolant hole in a frame of a cooling system formed on an edge surface and allows a cooling surface formed by the flow of a coolant through the coolant hole to cool a battery cell directly.

Technical Solution

In one aspect of the present disclosure, there is provided a direct cooling-type battery pack which is prevented from leakage caused by swelling through a cooling surface formed on an edge surface of a battery cell and is applicable to a bi-directional cell, the direct cooling-type battery pack including: a battery module having a plurality of battery cells stacked therein; a cooling frame corresponding to a casing in which the battery module is enclosed, and forming a cooling surface on an edge surface in a direction of 90° from a stacking surface on which the battery cells are stacked; and a heat sink which is positioned at the bottom of the cooling surface, is coupled with a cooling frame enclosing the battery module and mounted to the upper part thereof, stores a coolant therein, and supplies the thus stored coolant to the cooling surface.

The edge surface is one formed in one direction remaining except the directions of electrodes of a bi-directional cell among the directions of four segments formed on a quadrangular body surface of the battery cell.

A thermal interface material (TIM) is positioned between the battery module and the cooling frame and the TIM conducts heat emission from the upper battery module to the lower cooling frame.

The TIM is a thermal resin

The cooling surface of the cooling frame has a coolant hole through which the coolant supplied from the heat sink flows.

When the cooling frame enclosing the battery module is mounted to the upper part of the heat sink, the sectional surface of the cooling surface forms a stacked structure including: the edge of the battery cell; the TIM adjacent to the lower part of the edge; the cooling frame having the coolant hole and adjacent to the lower part of the TIM; and the heat sink coupled to the lower part of the cooling frame.

Advantageous Effects

According to an aspect of the present disclosure, a direct cooling-type cooling surface is formed on one edge surface of a battery pack except the bi-directional electrode surfaces and swelling surfaces to prevent leakage of a coolant caused by swelling and to provide a battery pack applicable to a bi-directional cell.

In addition, since a coolant hole is formed in a cooling frame corresponding to the casing of a battery pack and the surface of the coolant hole, through which a coolant flows, forms a cooling surface in the edge surface of a battery cell so that the battery cell may be cooled directly, it is possible to provide a high heat emission effect.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1A:
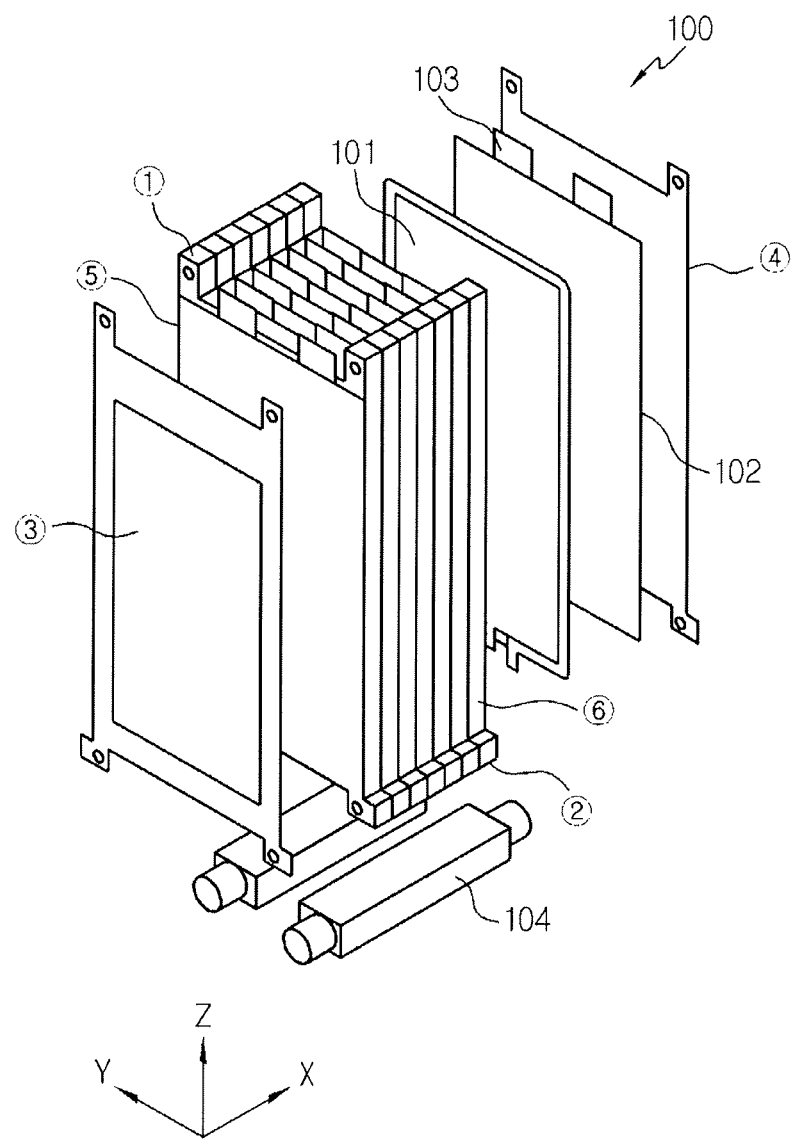
FIG. 1 and FIG. 2 are schematic views illustrating, the conventional uni-directional battery pack using a direct cooling-type cooling system.
Figure 1B:
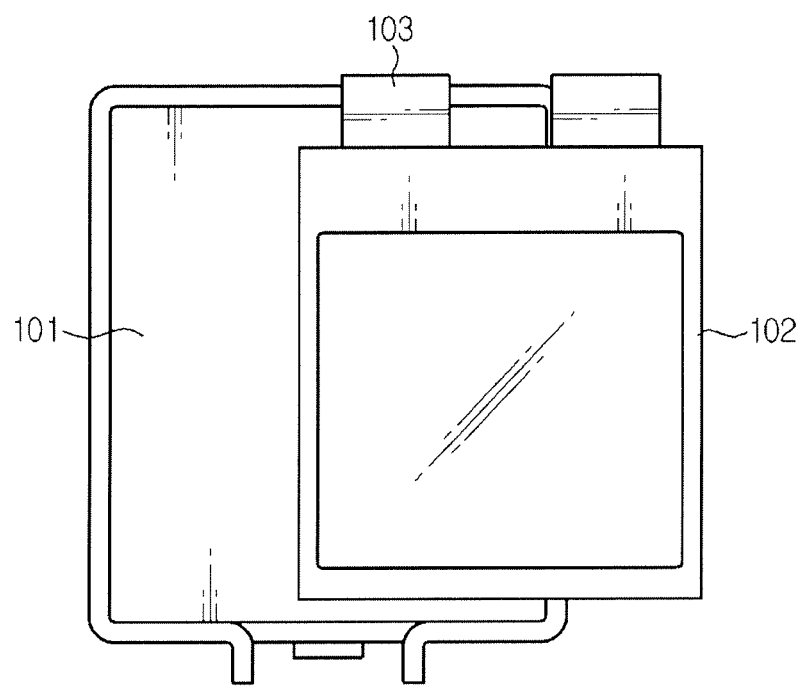
Figure 2:
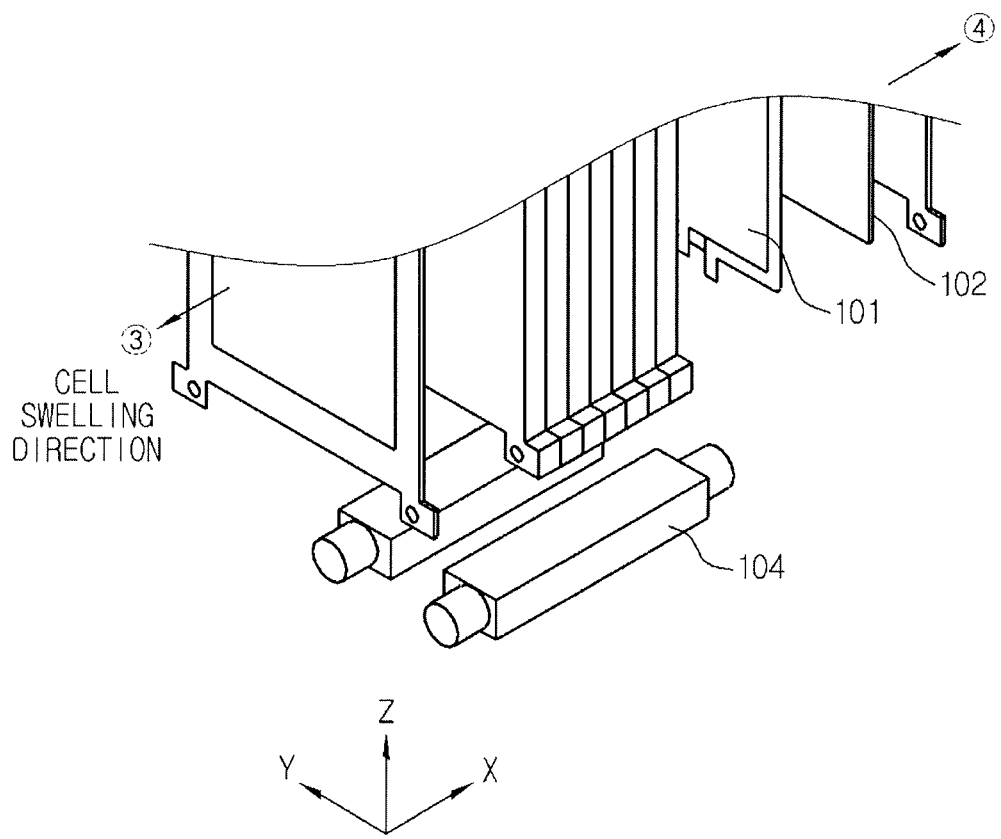
Figure 3:
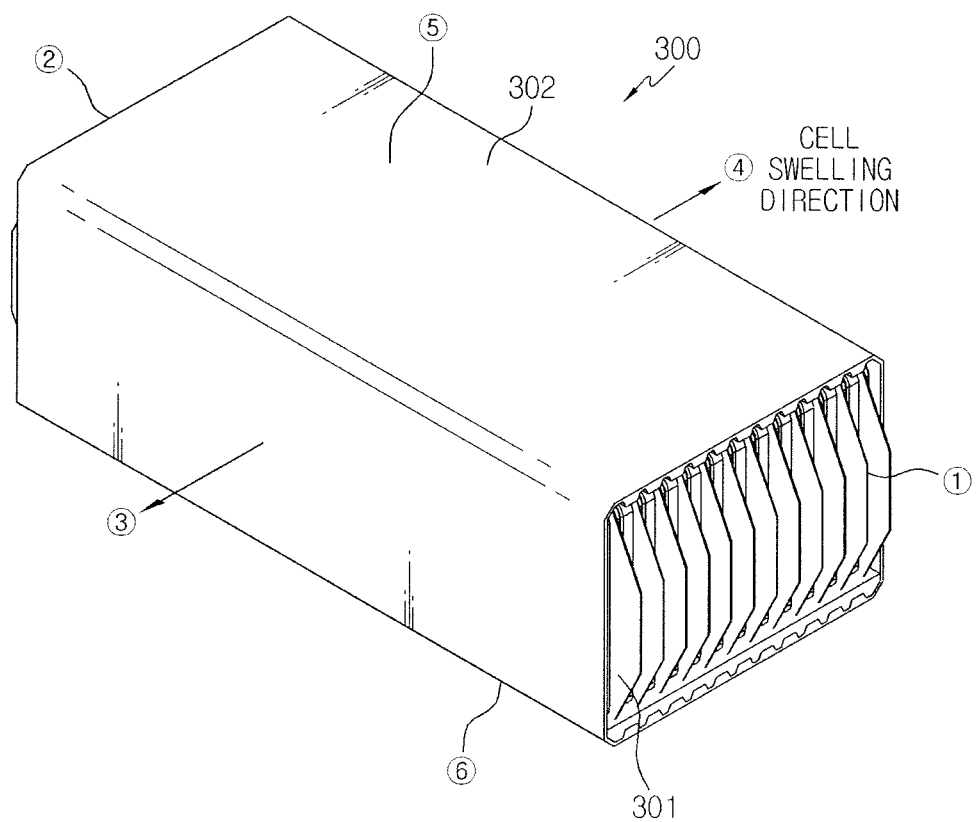
FIG. 3 to FIG. 5 are schematic views illustrating the battery pack according to an embodiment of the present disclosure.
Figure 4:
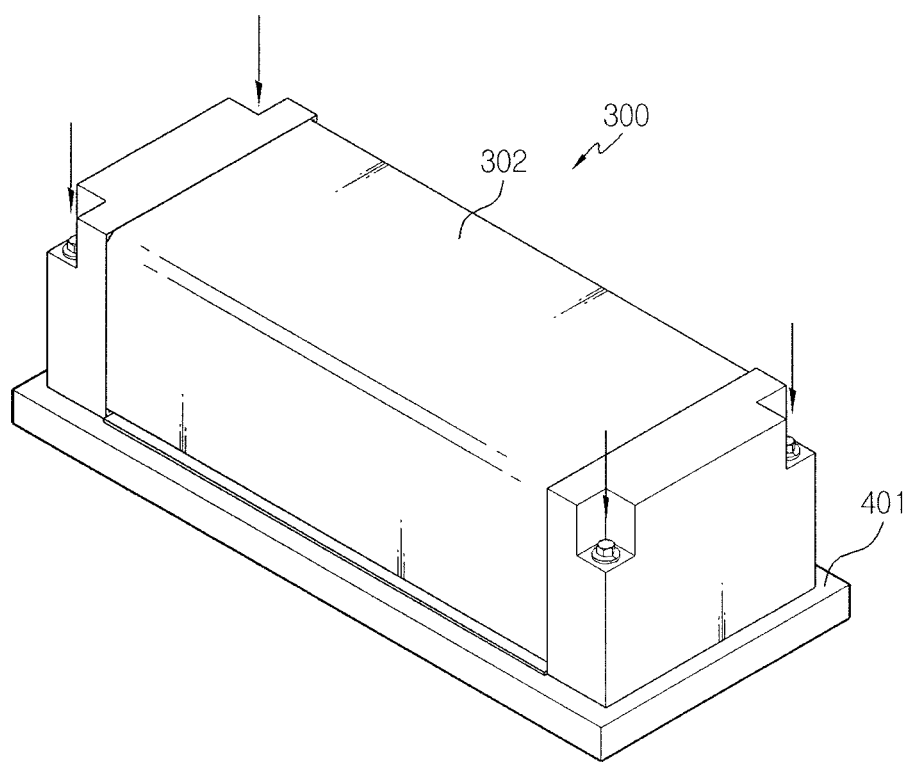
Figure 5:
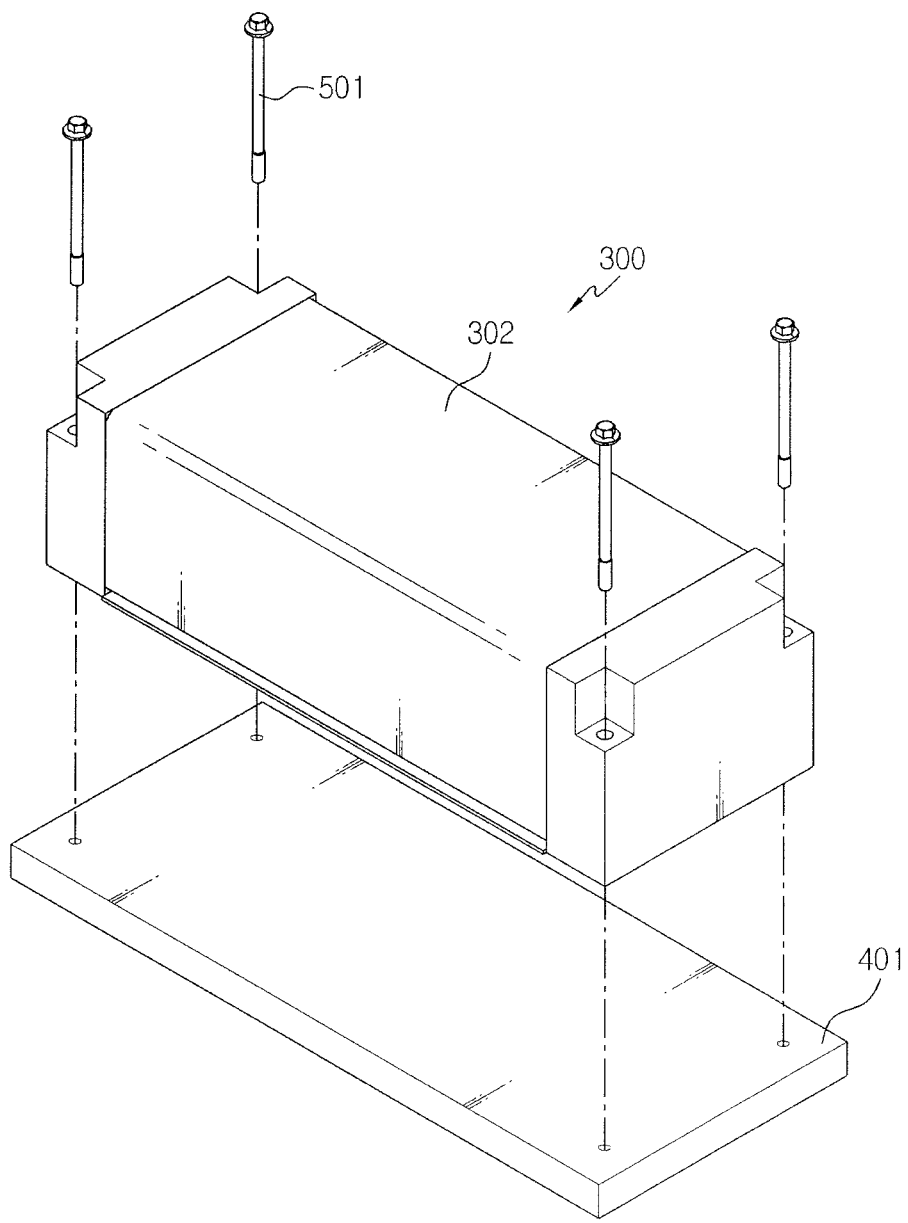

FIG. 3 to FIG. 5 are schematic views illustrating the battery pack 300 according to an embodiment of the present disclosure.

Referring to FIG. 3, the battery pack 300 according to an embodiment of the present disclosure includes a battery module having battery cells 301 stacked therein, and a cooling frame 302 enclosing the battery module.

Unlike the conventional cooling system of a battery pack 100, the cooling system of the battery according to the present disclosure is free from a cooling plate 101 positioned in every gap between the adjacent battery cells 301. Since the cooling plate 101 is eliminated, the battery pack 300 according to the present disclosure has a decreased volume to allow weight lightening/downsizing of a battery and to reduce manufacturing cost.

Herein, when assuming that the battery cell 301 is one quadrangular body surface (surface ③ or surface ④) equivalent to body side, the body surfaces of each of the battery cells 301 are stacked to form the battery module, and thus the body surface corresponds to the stacking surface. Among the directions of the four segments of the quadrangular body surface, surface ① and surface ② are formed in the directions of both electrode, surface ③ and surface ④ are formed on the body surfaces (stacking surfaces) in the swelling directions, and the remaining edge surfaces form surface ⑤ and surface ⑥. Herein, the cooling surface is formed on the edge surface, i.e., surface ⑥. In other words, surface ⑥ as a cooling surface is positioned on the edge surface in the direction of 90° from the stacking surfaces, surface ③ and surface ④.

Referring to FIG. 4 and FIG. 5, the cooling frame 302 enclosing the battery module is mounted on the heat sink 401 corresponding to a pack level cooling system, and then is fixed by a bolt 501 in the directions of the arrows as shown in FIG. 5 at four corners thereof.

Figure 6:
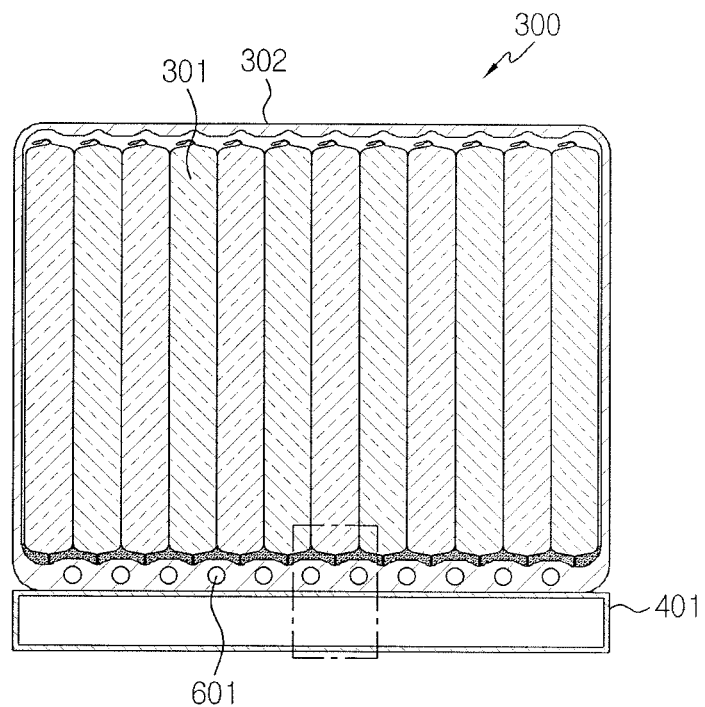
FIG. 6 and FIG. 7 are schematic sectional views illustrating the battery pack of FIG. 4.
Figure 7:
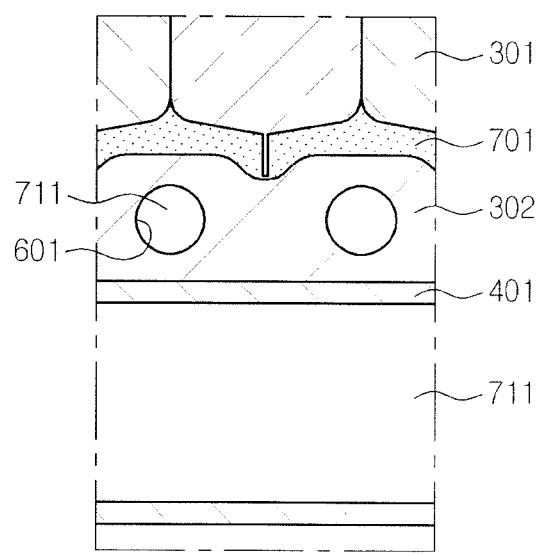

FIG. 6 is a schematic sectional view of the battery pack of FIG. 4 and FIG. 7 is a partial enlarged view of FIG. 6.

Referring to FIG. 6, the sectional view of surface ① of the battery pack 300 is illustrated. The heat of the battery cells 301 is emitted in the direction toward the heat sink 401 forming the heat sink at the bottom. A coolant hole 601 is formed on the cooling surface at the bottom of the cooling frame 302.

Referring to FIG. 7, a thermal interface material (TIM) 701 as a heat conductive material is positioned between the bottom battery cell 301 and the cooling frame 302. The TIM 701 corresponds to a thermal resin. The resin fills up the gap formed between the frame 301 and the battery cell 301 to eliminate any vacant space. The resin filling the vacant space of the gap improves heat conductivity and helps rapid emission of the heat generated from the battery cell 301 in a direction toward the lower heat sink 401. The coolant 711 enclosed in the heat sink 401 is introduced to the cooling frame 302 and the thus introduced coolant 711 flows through the flow path formed by a coolant hole 601, thereby forming a cooling surface on surface ⑥.

Figure 8:
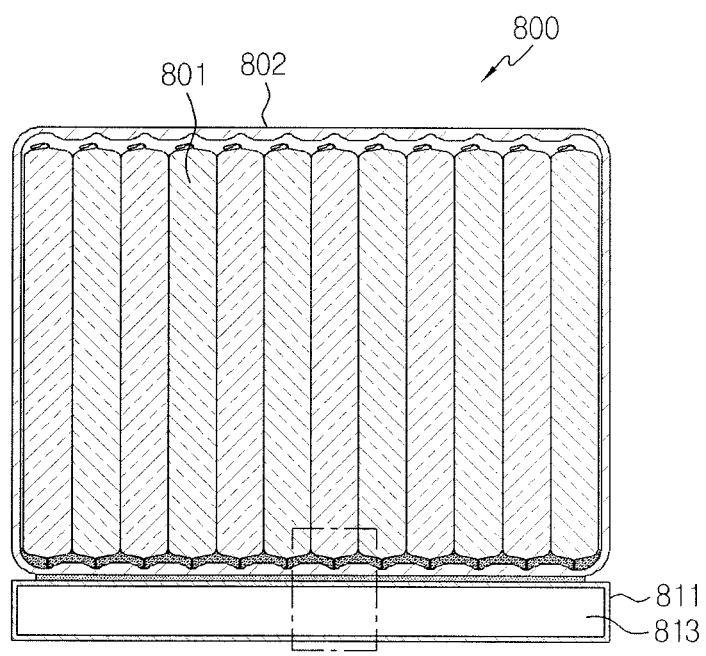
FIG. 8 and FIG. 9 are sectional views illustrating the indirect cooling-type battery packs according to another embodiment of the present disclosure.
Figure 9:
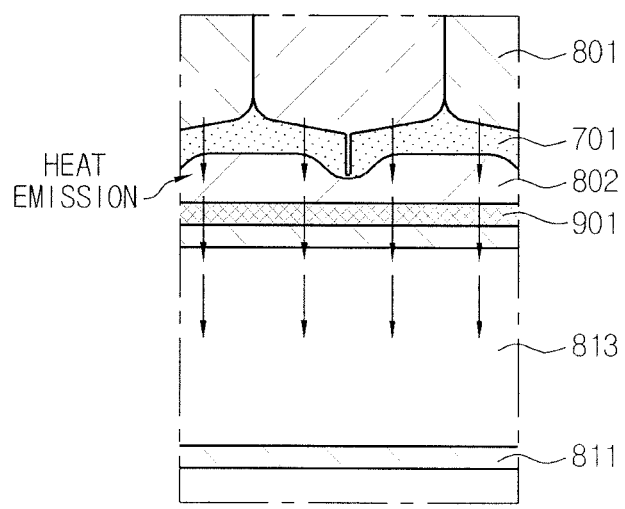

FIG. 8 and FIG. 9 show the indirect cooling-type battery pack 800 according to another embodiment of the present disclosure.

Referring to FIG. 8, the sectional view of surface ① of the battery pack 800 is illustrated. The heat of the battery cell 801 is emitted in the direction of a heat sink 811 forming the cooling surface at the bottom. Unlike FIG. 6, no coolant hole 601 is formed at the bottom of a cooling frame 802. The coolant 813 stored in the heat sink 811 attached to the bottom surface of the cooling frame 802 cools the heat of the battery cell 801, while not being introduced to the cooling frame 802.

Referring to FIG. 9, the battery pack 800 includes a battery cell 801, TIM 701, cooling frame 802, thermal adhesive material 901, heat sink 811 and a coolant 813, when viewed from the section thereof. Since the coolant 813 of the heat sink 811 is not introduced to the cooling frame 802, an indirect cooling-type cooling surface is formed on surface ⑥.

As compared to the direct cooling method as shown in FIG. 7, the sectional structure of FIG. 7 is free from the thermal adhesive material 901 and has a decreased cooling zone, and thus an increase in cooling efficiency is expected. In addition, according to the sectional structure of FIG. 7, the coolant 711 is introduced to and flows through the coolant hole 601 of the cooling frame 302, thereby providing increased cooling efficiency through a direct cooling method.

The present disclosure has been described in detail with reference to particular embodiments and drawings, but it should be understood that the scope of the present disclosure is not limited thereto. It should be also understood that various changes and modifications within the scope of the disclosure will become apparent to those skilled in the art from this detailed description.

What is claimed is:

1. A direct cooling-type battery pack which is prevented from leakage caused by swelling through a cooling surface formed on an edge surface of a battery cell and is applicable to a bi-directional cell, the direct cooling-type battery pack comprising:
a battery module having a plurality of battery cells that are stacked side-by-side via stacking surfaces of the plurality of battery cells, each of the plurality of cells having a projection at an end thereof;
a cooling frame enclosing the battery module and including a casing having a quadrangular body surface elongated in a length direction,
wherein the casing includes:
first and second stacking surfaces that are parallel to the stacking surfaces of the plurality of battery cells;
a cooling surface in a direction of 90° from the first and second stacking surfaces on which the plurality of battery cells are stacked;
a top surface that is opposite to the cooling surface; and
openings at opposite ends in the length direction where electrodes of the plurality of battery cells are exposed; and
a heat sink, which is positioned at a bottom side of the cooling surface, is coupled with the cooling frame mounted to an upper part thereof, stores a coolant therein, and supplies the stored coolant to the cooling surface,
wherein a top side of the cooling surface is a wavy surface including a plurality of alternating peaks and valleys,
wherein the projection of the each cell is nested on a valley among the plurality of valleys in a one-to-one configuration, and
wherein a cooling plate is not disposed between adjacent battery cells of the plurality of battery cells so that the adjacent battery cells are in direct contact via the stacking surfaces.

2. The battery pack according to claim 1, wherein the cooling surface is one formed in one direction remaining except directions of electrodes of the bi-directional cell among directions of four surfaces formed on the quadrangular body surface of the cooling frame.

3. The battery pack according to claim 1, further comprising a thermal interface material (TIM) positioned between the battery module and the cooling frame, wherein the TIM conducts heat emitted from the battery module to the cooling frame.

4. The battery pack according to claim 3, wherein the TIM is a thermal resin.

5. The battery pack according to claim 3, wherein a portion of the cooling frame having the cooling surface has a coolant hole through which the coolant supplied from the heat sink flows.

6. The battery pack according to claim 5, wherein when the cooling frame enclosing the battery module is mounted to the upper part of the heat sink, a sectional surface of the cooling surface forms a stacked structure comprising:
an edge of each battery cell;
the TIM adjacent to a lower part of the edge;
the cooling frame having the coolant hole being adjacent to the lower part of the TIM; and
the heat sink coupled to a lower part of the cooling frame.

7. The battery pack according to claim 1, wherein the top surface, the first and second stacking surfaces and the cooling surface of the cooling frame are formed as a single piece.

8. The battery pack according to claim 1, wherein the peaks are located between adjacent stacking surfaces of the plurality of battery cells.

9. The battery pack according to claim 5, wherein the peaks correspond to the coolant hole.

10. The battery pack according to claim 1, wherein the peaks respectively include a flat plateau.

11. The battery pack according to claim 1, wherein the projection contacts a bottom surface of the valley.

* * * * *